US008856209B2

(12) United States Patent
Bryce et al.

(10) Patent No.: US 8,856,209 B2
(45) Date of Patent: Oct. 7, 2014

(54) SYSTEMS AND METHODS FOR SYNCHRONIZATION IN A NETWORKED ENVIRONMENT

(75) Inventors: Stuart Bryce, New South Wales (AU); Adam J. Kent, Sydney (AU)

(73) Assignee: Tymphany Hong Kong Limited, Sausalito, CA (US)

( * ) Notice: Subject to any disclaimer, the term of this patent is extended or adjusted under 35 U.S.C. 154(b) by 417 days.

(21) Appl. No.: 12/600,965

(22) PCT Filed: May 30, 2008

(86) PCT No.: PCT/AU2008/000780
§ 371 (c)(1),
(2), (4) Date: Nov. 19, 2009

(87) PCT Pub. No.: WO2008/144842
PCT Pub. Date: Dec. 4, 2008

(65) Prior Publication Data
US 2010/0161723 A1  Jun. 24, 2010

Related U.S. Application Data

(60) Provisional application No. 60/941,024, filed on May 31, 2007.

(51) Int. Cl.
*G06F 15/16* (2006.01)
*G06F 7/00* (2006.01)
(52) U.S. Cl.
USPC ........... 709/203; 709/201; 709/202; 709/205; 709/248; 707/620
(58) Field of Classification Search
USPC ................................................ 709/203, 248
See application file for complete search history.

(56) References Cited

U.S. PATENT DOCUMENTS

| 6,199,170 | B1 | 3/2001 | Dietrich |
| 7,096,271 | B1 | 8/2006 | Omoigui et al. |
| 2003/0117991 | A1* | 6/2003 | Beyer et al. ............ 370/349 |
| 2007/0226530 | A1* | 9/2007 | Celinski et al. ........ 713/500 |

FOREIGN PATENT DOCUMENTS

WO  WO 02/054662 A1  7/2002
WO  WO 2007/076575 A1  7/2007

OTHER PUBLICATIONS

International Search Report—2 pgs. Jul. 11, 2008, Avega Systems PTY Ltd.

* cited by examiner

Primary Examiner — Ranodhi Serrao
Assistant Examiner — Farrukh Hussain
(74) Attorney, Agent, or Firm — Tarolli, Sundheim, Covell & Tummino LLP

(57) ABSTRACT

Described herein are systems and methods for synchronization in a networked environment. For example, some embodiments provide methods for synchronizing a client device having a client media time reference with a server device having a server media time reference. In some cases such methods are embodied in computer readable code that is executable on one or more processors. Furthermore, some embodiments provide hardware, such as networked media devices that are configured to perform such methods. In overview, in some embodiments a client obtains timing information from a server and, on the basis of this timing information, applies an adjustment to a client control time reference, thereby to synchronize the client media time reference with the server media time reference. Some embodiments are particularly directed to the situation where there is a desire to synchronize networked media devices across a combination of wired and wireless networks.

14 Claims, 10 Drawing Sheets

SYSTEMS AND METHODS FOR SYNCHRONIZATION IN A NETWORKED ENVIRONMENT

CROSS-REFERENCE TO RELATED APPLICATION

This application is a U.S. National Stage Application filed under 35 U.S.C. §371 of PCT/AU2008/000780, filed May 30, 2008, and entitled Systems and Methods for Synchronization in a Networked Environment, which claims the benefit of U.S. Provisional Patent Application No. 60/941,024, filed on May 31, 2007, and entitled Systems and Methods for Synchronization in a Networked Environment. The entire contents of each of the above-identified patent applications are incorporated herein by reference.

FIELD OF THE INVENTION

The present invention relates generally to synchronization in a networked environment, and some embodiments provide a method for synchronizing a client device with a server device coupled to the client device, for example based on timing references provided by the respective devices. Embodiments have been particularly developed for networked media applications. While some embodiments will be described herein with particular reference to such applications, it will be appreciated that the invention is not limited to such a field of use, and is applicable in broader contexts.

BACKGROUND OF THE INVENTION

Any discussion of the prior art throughout the specification should in no way be considered as an admission that such prior art is widely known or forms part of common general knowledge in the field.

Wireless networks are becoming increasingly popular with consumers. It is often desirable to provide playback of multiple audio and visual channels in a networked environment. In particular, there is perceived consumer desire for high quality wireless speakers systems. For such systems, the individual multimedia devices need to be synchronized, typically with the accuracy of a few microseconds. Failure to accurately synchronize devices often results in the production of unwanted playback effects.

Some synchronization techniques rely on frequency synchronizing a server and a client local clock within devices that are connected to a shared medium, with reference to a separate global clock observable by all devices coupled to that wireless network. However, wired networks typically do not have an observable global clock, as switch devices typically isolate the individual carriers to avoid collisions. Therefore these techniques are substantially isolated to topologies where the devices are connected to a shared medium.

There is a need in the art for improved systems and methods for synchronization in a networked environment.

SUMMARY

One embodiment provides a method for synchronizing a client device having a client media time reference with a server device having a server media time reference, the server device being coupled to the client device, the method comprising the steps of:
(a) sending at least one request to the server device, the request being indicative of an instruction to provide timing information indicative of a server control time reference and the server media time reference;
(b) storing, for each request, according to a client control time reference, a respective first client value indicative of the time at which that request was sent;
(c) receiving from the server device, for each request, a respective response including timing information;
(d) storing, for each request, according to the client control time reference, a respective second client value indicative of the time at which the corresponding response was received;
(e) processing, for each request and corresponding response, the first client value, the second client value, and the timing information, thereby to derive adjustment information; and
(f) generating a client media time reference by applying the adjustment information to the client control time reference, thereby to synchronize the client media time reference with the server media time reference.

One embodiment provides a method wherein the client media time reference is frequency synchronized with the server media time reference.

One embodiment provides a method wherein the server device is coupled to the client device, at least in part, by a wired network.

One embodiment provides a method wherein the server device is coupled to and synchronized with one or more further devices on a synchronized wireless network.

One embodiment provides a method wherein the synchronized wireless network is synchronized based on any one of the server control time reference.

One embodiment provides a method wherein the client control time reference is adjusted in a frequency locked loop to synchronize the client media time reference to the server media time reference.

One embodiment provides a method wherein the timing information includes:
a first server value, according to the server control time reference, indicative of the time at which the server device received the request;
a second server value, according to the server control time reference, indicative of the time at which the server device sent the corresponding response; and
a ratio between the frequency of the server control time reference and the server media time reference.

One embodiment provides a method wherein the adjustment information is indicative of a first frequency ratio between the server control time reference and the client control time reference and a second frequency ratio between the server media time reference and the server control time reference.

One embodiment provides a method wherein the timing information includes:
a first server value, according to the server control time reference, indicative of a time at which the server device processed the response; and
a ratio between the frequency of the server control time reference and the server media time reference.

One embodiment provides a method wherein the adjustment information is indicative of a first frequency ratio between the server control time reference and the client control time reference and a second frequency ratio between the server media time reference and the server control time reference.

One embodiment provides a method wherein the first server value is produced according to the Network Time Protocol.

One embodiment provides a method wherein the first server value is produced according to a time server protocol in conjunction with a time synchronization function.

One embodiment provides a method further comprising repeating steps (a) through (d) at least once.

One embodiment provides a method wherein steps (e) and (f) are performed subsequent each repeat of (d).

One embodiment provides a method wherein steps (e) and (f) are performed subsequent to predefined repeats of (d).

One embodiment provides a method wherein each timing information includes:
  a first server value, according to the server control time reference, indicative of the time at which the server device received the request;
  a second server value, according to the server control time reference, indicative of the time at which the server device sent the corresponding response; and
  a ratio between the frequency of the server control time reference and the server media time reference.

One embodiment provides a method wherein the first server value and the second server value are each associated with a Time Synchronization Function Protocol.

One embodiment provides a method wherein the client control time reference is adjusted in a frequency locked loop to synchronize the client media time reference to the server media time reference.

One embodiment provides a method wherein the adjustment information is indicative of a first frequency ratio between the server control time reference and the client control time reference and a second frequency ratio between the server media time reference and the server control time reference.

One embodiment provides a method wherein the frequency ratio between the server control time reference and the client control time reference is calculated from a linear regression between the mean of the first and second server value and the mean of the first and second client value for each request and corresponding response.

One embodiment provides a method wherein the server control time reference and the server media time reference are defined by a first common timing reference.

One embodiment provides a method wherein the client control time reference and the client media time reference are defined by a second common timing reference.

One embodiment provides a computer-readable carrier medium carrying a set of instructions that when executed by one or more processors cause the one or more processors to carry out a method of synchronizing a client device having a client media time reference with a server device having a server media time reference, the server device being coupled to the client device, the method comprising the steps of:
  (a) sending at least one request to the server device, the request being indicative of an instruction to provide timing information indicative of a server control time reference and the server media time reference;
  (b) storing, for each request, according to a client control time reference, a respective first client value indicative of the time at which that request was sent;
  (c) receiving from the server device, for each request, a respective response including timing information;
  (d) storing, for each request, according to the client control time reference, a respective second client value indicative of the time at which the corresponding response was received;
  (e) processing, for each request and corresponding response, the first client value, the second client value, and the timing information, thereby to derive adjustment information; and
  (f) generating a client media time reference by applying the adjustment information to the client control time reference, thereby to synchronize the client media time reference with the server media time reference.

In one embodiment the carrier medium is a medium bearing a propagated signal detectable by at least one processor of the one or more processors and representing the set of instructions.

In one embodiment the carrier medium is a carrier wave bearing a propagated signal detectable by at least one processor of the one or more processors and representing the set of instructions a propagated signal and representing the set of instructions.

In one embodiment the carrier medium is a transmission medium in a network bearing a propagated signal detectable by at least one processor of the one or more processors and representing the set of instructions.

One embodiment provides a client device including:
  a network interface for allowing the client device to communicate with a server device via a data network, the server device having a server media time reference;
  a processor coupled to the network interface for performing a method of synchronizing the client device having a client media time reference with a the device, the method comprising the steps of:
    (a) sending at least one request to the server device, the request being indicative of an instruction to provide timing information indicative of a server control time reference and the server media time reference;
    (b) storing, for each request, according to a client control time reference, a respective first client value indicative of the time at which that request was sent;
    (c) receiving from the server device, for each request, a respective response including timing information;
    (d) storing, for each request, according to the client control time reference, a respective second client value indicative of the time at which the corresponding response was received;
    (e) processing, for each request and corresponding response, the first client value, the second client value, and the timing information, thereby to derive adjustment information; and
    (f) generating a client media time reference by applying the adjustment information to the client control time reference, thereby to synchronize the client media time reference with the server media time reference.

In one embodiment the client device includes a media playback device.

Reference throughout this specification to "one embodiment" or "an embodiment" or "some embodiments" means that a particular feature, structure or characteristic described in connection with the embodiment is included in at least one embodiment of the present invention. Thus, appearances of the phrases "in one embodiment" or "in an embodiment" or "in some embodiments" in various places throughout this specification are not necessarily all referring to the same embodiment, but may refer to the same embodiment. Furthermore, the particular features, structures or characteristics may be combined in any suitable manner, as would be apparent to one of ordinary skill in the art from this disclosure, in one or more embodiments.

BRIEF DESCRIPTION OF THE DRAWINGS

Embodiments of the invention will now be described, by way of example only, with reference to the accompanying drawings in which.

DETAILED DESCRIPTION

Described herein are systems and methods for synchronization in a networked environment. For example, some embodiments provide methods for synchronizing a client device having a client media time reference with a server device having a server media time reference. In some cases such methods are embodied in computer readable code that is executable on one or more processors. Furthermore, some embodiments provide hardware, such as networked media devices that are configured to perform such methods. In overview, in some embodiments a client obtains timing information from a server and, on the basis of this timing information, applies an adjustment to a client control time reference, thereby to synchronize the client media time reference with the server media time reference. Some embodiments are particularly directed to the situation where there is a desire to synchronize networked media devices across a combination of wired and wireless networks.

Figure 1A:
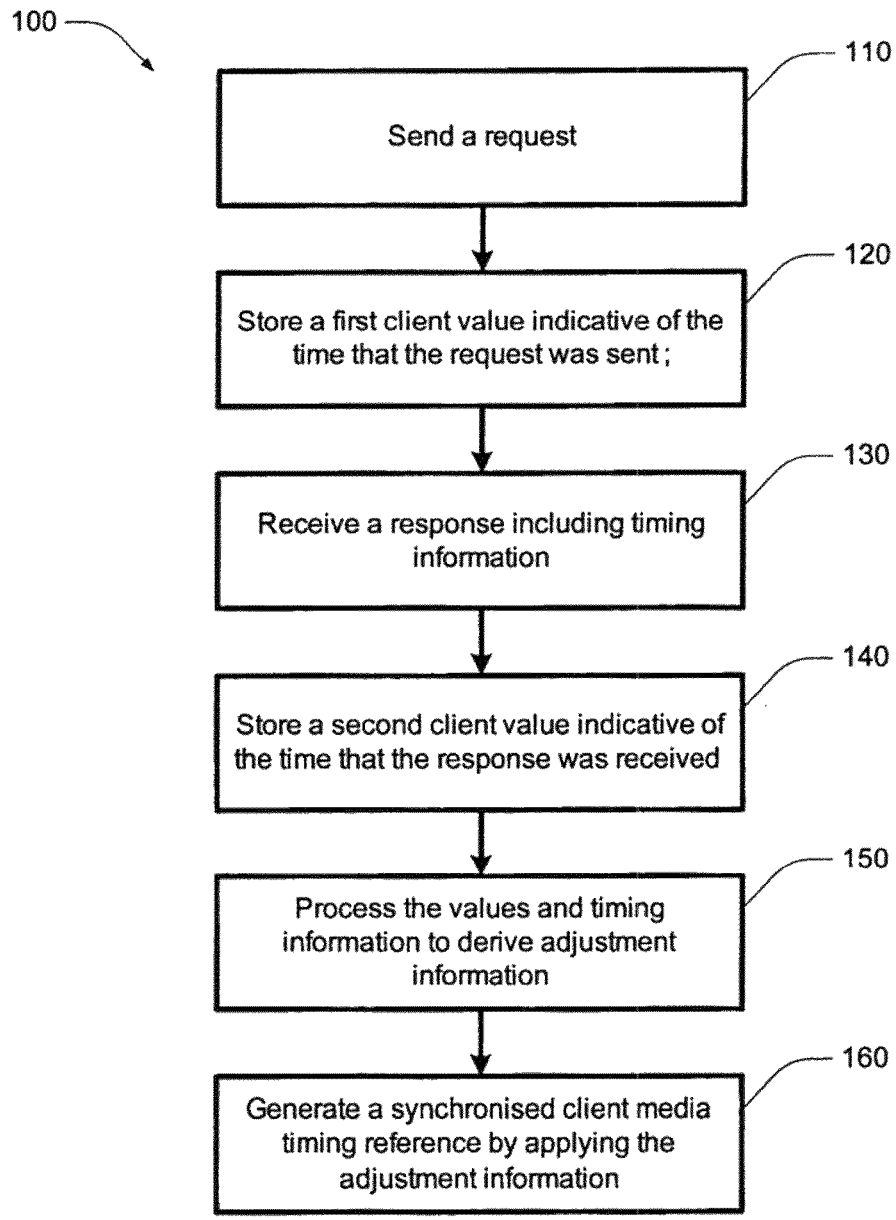
FIG. 1A schematically illustrates a method according to one embodiment.

FIG. 1A illustrates a method 100 according to one embodiment. In overview, method 100 is performable by a client device having a client media time reference, and allows this client device to synchronize with a server device having a server media time reference. For example, the client device includes a memory module for maintaining software instructions on the basis of which method 100 is performable, and additionally includes a processor on which these software instructions are able to be executed. The server device is coupled to the client device by a data network or, in some cases, multiple data networks (such as a wired network in combination with a wireless network).

Method 100 includes, at step 110, sending at least one request to the server device, this request being indicative of an instruction to provide timing information, specifically timing information that is indicative of a server control time reference and the server media time reference. For each request, a first client value, measured according to a client control time reference, is stored in memory at step 120. This first client value is indicative of the time at which the relevant request was sent.

For each request, the server device produces a corresponding response that is indicative of the requested timing information. At step 130, a corresponding responses for the or each request are received. For each response, a second client value, measured according to a client control time reference, is stored at step 140. This second client value is indicative of the time at which that response was received.

Step 150 includes processing the first client value, the second client value, and the timing information, thereby to derive adjustment information. This adjustment information is then applied, at step 160, to the client control time reference, thereby to substantially synchronize the client media time reference with the server media time reference.

Figure 1B:
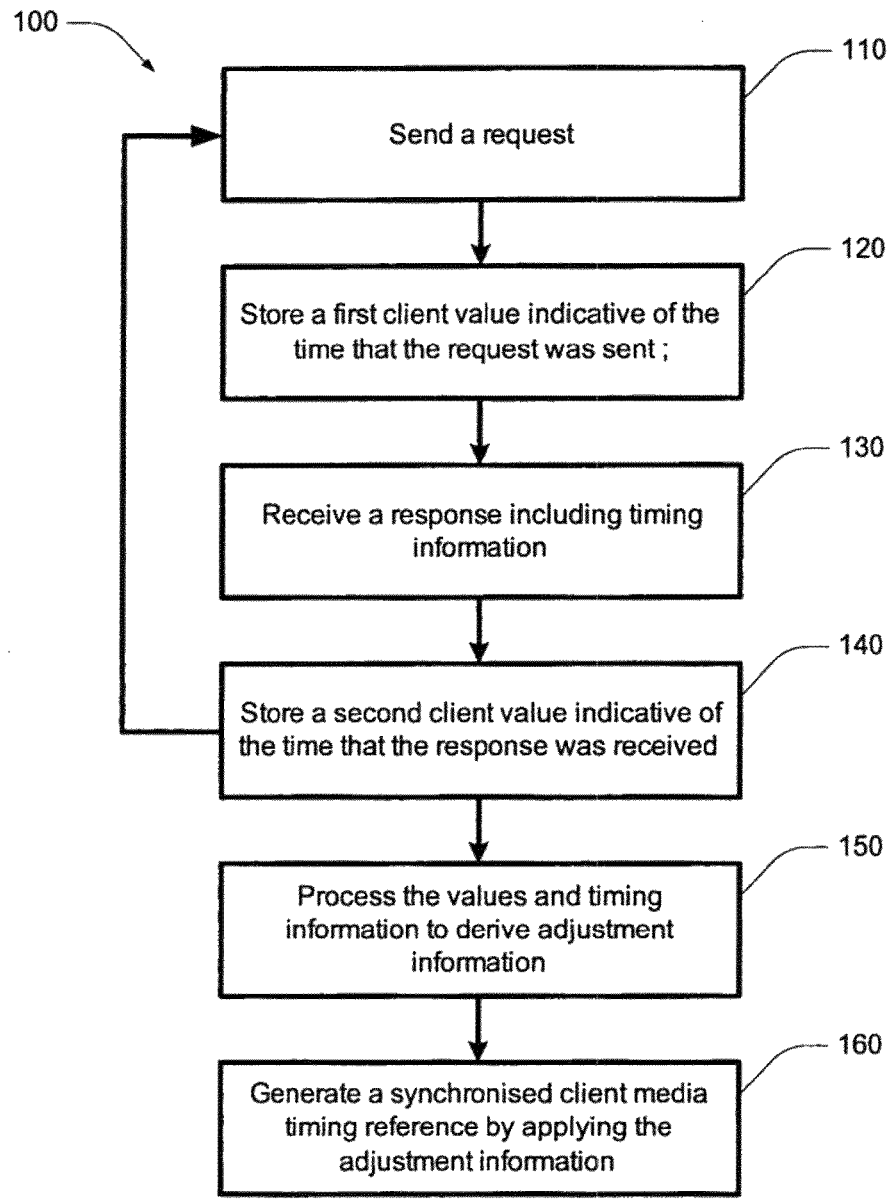
FIG. 1B schematically illustrates a method according to one embodiment.

In the embodiment of FIG. 1B, steps 110 through 140 are repeated one or more times. In some embodiments, steps 150 and 160 are performed subsequent each repeat of step 140. In some other embodiments steps 150 and 160 are performed subsequent to predefined repeats of step 140 (for example, on one or more fourth repeats of step 140).

The term "synchronization" in the context of synchronization between the server and client media time references should be read broadly to include any one or more of time, frequency and phase synchronization. This may be achieved though a number of approaches such as (but not limited to) frequency locked loops and phase locked loops. It will be appreciated that "synchronized" and "synchronization" are absolute terms, however in this context they are defined to include situations where synchronization is within some predefined or abstract limit. These limits are typically imposed by the application for which synchronization is required. That is, the term "synchronization" essentially means "substantial synchronization".

A "server device" may be any device configured for connection to a data network. As used here, it is assumed that a server device is configured to produce or observe a server media time reference. The server device need not be a device associated with the playback or provision of any media.

A "client device" may be any device configured for connection to a data network. As used here, it is assumed that a client device is configured to provide a client media time reference that is synchronized to a server media time reference. The client device need not be a device associated with the playback or provision of any media.

A time reference (or equivalently a timing reference), in some embodiments, is in the form of a counter that increments by a known amount at each cycle of a clock.

A "control time reference" (or equivalently "control timing reference") is indicative of a clock or counter that is configured to provide a time base for measuring timing information, for example Time Synchronization Function (TSF) as defined in IEEE 802.11. Such a time base typically has a sufficient resolution to provide the desired level of synchronization.

The term "server control time reference" (or equivalently "server control timing reference") describes a control timing reference within the server device. The term "client control time reference" (or equivalently "client control timing reference") describes the control timing reference within a client device.

A "media time reference" (or equivalently "media timing reference") is indicative of a clock or counter that is configured to provide a time base for playback of a digital media file. This time base is operatively associated with the sample rate of the media, but need not be the sample rate. The term "server media time reference" describes the media timing reference within the server device. The term "client media time reference" describes the media timing reference within the client device.

A ratio between the frequency of the server control time reference and the server media time reference is used to synchronize the client media time reference with the server media time reference. In one embodiment, the server control time reference and the server media time reference are the same. In another embodiment the client control time reference and the client media time reference are substantially the same whereby both are synchronized to the server media time reference.

The term "timing information" describes, in some embodiments, information used to establish:

A frequency relationship between the server control time reference and the client control time reference.

A frequency relationship between the server control time reference and the server media time reference.

In one embodiment, the timing information includes a first server value corresponding to a counter value of the server control time reference at the time a request was processed. In another embodiment the timing information includes a first server value corresponding to a counter value of the server control time reference at the time a request was received and a second server value corresponding to the counter value of a server control time reference at the time a response was processed. The timing information further includes a third server value corresponding to the ratio between the frequency of server control time reference and the server media time reference.

"Adjustment information" includes, in some embodiments, information indicative of a manner in which the current client media time reference is be adjustable, thereby to substantially synchronize the client media time reference with the server media time reference. Typically this information is in the form of a ratio between the frequency of client control time reference and the client media time reference, which is leveraged to substantially synchronize the client media time reference with the server media time reference. This may be used in a clock circuit to divide (or multiply) the client control time reference to produce a client media time reference substantially synchronized with the server media time reference.

In an embodiment, and by way of example only, the ratio between the frequency of client control time reference and the client media time reference is derived on the basis of The ratio between the frequencies of the server control time reference (SCTR) and server media time reference (SMTR).

The ratio between the frequencies of server control time reference (SCTR) and client control time reference (CCTR).

That is:

$$\frac{F_{CCTR}}{F_{CMTR}} \approx \frac{F_{CCTR}}{F_{SCTR}} \times \frac{F_{SCTR}}{F_{SMTR}}$$

since it is required $$\frac{F_{CCTR}}{F_{CMTR}} \approx \frac{F_{CCTR}}{F_{CMTR}}.$$

It should be appreciated that a significant practical result of such an embodiment is that the server media time reference and client media time reference are frequency synchronized. This is optionally achieved by observing measurable ratios between multiple asynchronous clocks and linking these ratios by an estimated ratio, in this example the frequency ratio between the server control time reference and client control time reference. However, such an approach should not be regarded as limiting, and in other embodiments a similar result is realized by measuring different observable frequency relationships.

"Media" typically includes audio and/or video data. However, methods described herein, whilst finding particular application and relevance to media, are appropriate for substantially any signal manipulation requiring a substantially synchronized time reference to be derived from asynchronous time reference within two or more devices coupled by a data network.

Figure 2:
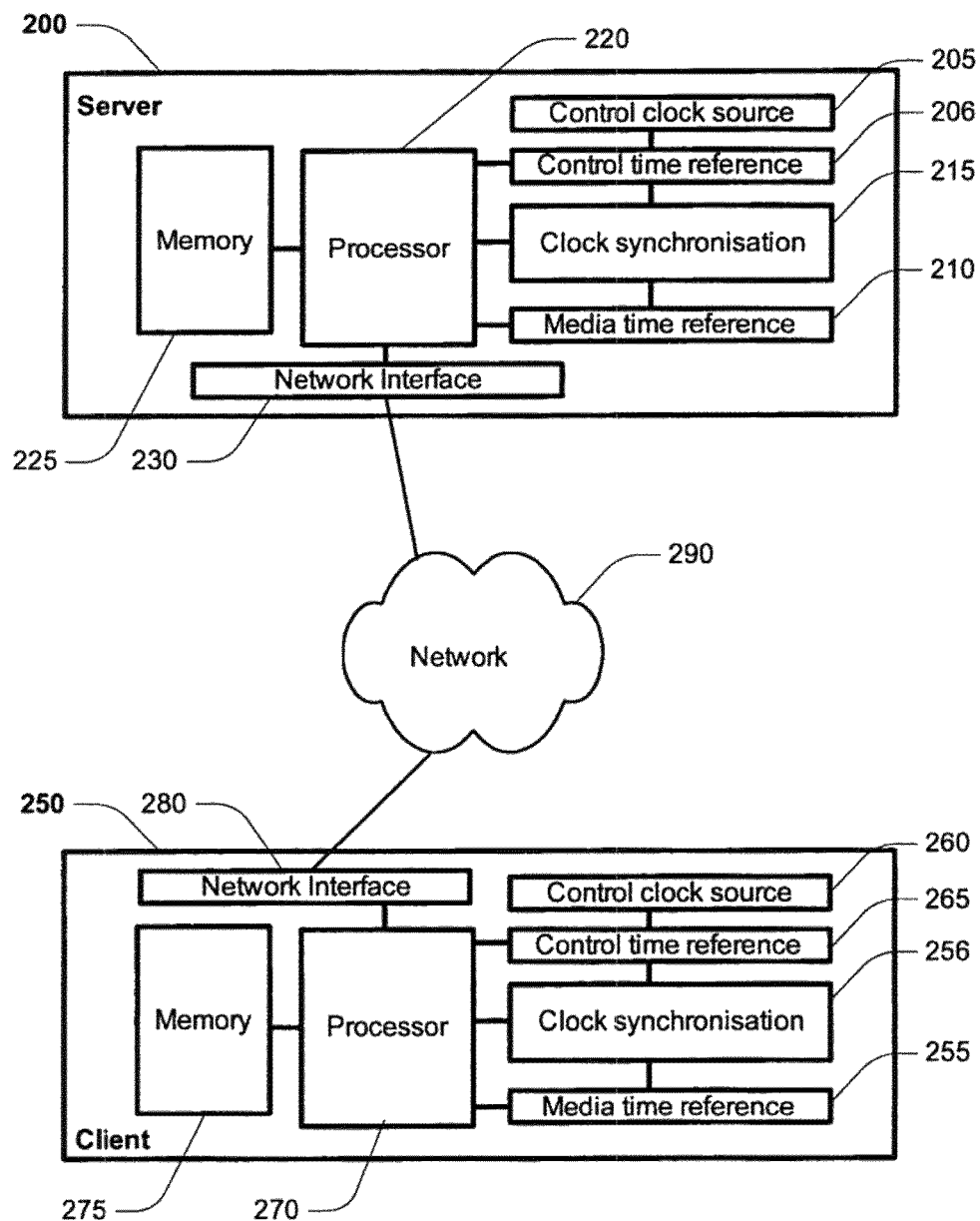
FIG. 2 schematically illustrates a network environment including a client device according to one embodiment.

FIG. 2 shows an exemplary embodiment of a server device 200 and a client device 250, wherein the client device is configured to perform a method as described above. For example, the method is performed on the basis of software instructions executed on a processor provided by the client device.

Referring to FIG. 2, the server device 200 includes a clock source 205, which is used to derive a control time reference 206. A media time reference 210 is derived from the control time reference 206 by a clock synchronization module 215.

The clock synchronization module is configured to derive a stable media clock reference at an appropriate frequency. The clock synchronization module in some embodiments implements or leverages a frequency locked loop, and/or a phase locked loop to derive such a stable signal. The clock synchronization module is configured to provide the ratio between the frequency of the control time reference 206 and the media time reference 210. In an embodiment, the clock synchronization module is be implemented, at least in part, on the basis of software instructions executed on one or more on a processors of the server device.

In this example, the processor 220 is coupled to both the control time reference 206 and the media time reference 210, and configured to read a counter value that is incremented at a rate proportional to the frequency of the respective time reference. The processor is also configured to store this value in memory 225. In this embodiment, the server processor 220 is further coupled to the clock synchronization module and configured to read the ratio between the frequency of the control time reference 206 and the media time reference 210, and the ratio between the frequency of the control time reference 206 and the media time reference 210 is provided by the clock synchronization module or derived in software.

In another embodiment the control clock source 206 and media time reference 215 of the server device are each free running (that is, they are not phase or frequency locked). In such an embodiment, the ratio between the frequency of the control time reference 206 and the media time reference 210 is conveniently provided by the clock synchronization module or alternately derived in software.

Referring to FIG. 2, client device 250 includes a clock source 255, which is used to derive a control time reference 256. A media time reference 260 is derived from the control time reference 256 by a clock synchronization module 265.

The clock synchronization module 265 of the client device is configured to derive a stable media clock reference at an appropriate frequency. This clock synchronization module in some embodiments implements or leverages a frequency locked loop, and/or a phase locked loop to derive such a stable signal. The clock synchronization module is configured to provide the media time reference 260 of the desired ratio of the frequency of the control time reference 256, such that the client media time reference 260 is substantially synchronized to the server media time reference 210. In an embodiment, the clock synchronization module may be implemented, at least in part, by software running on a processor.

The processor 270 is coupled to both the control time reference 256 and the media time reference 260, and configured to read a counter value that is incremented at a rate proportional to the frequency of the respective time reference. The processor is also configured to be able to store this value in memory 275. In this embodiment, the client processor 270 is further coupled to the clock synchronization module and configured to read the ratio between the frequency of the control time reference 206 and the media time reference 270.

Figure 3A:
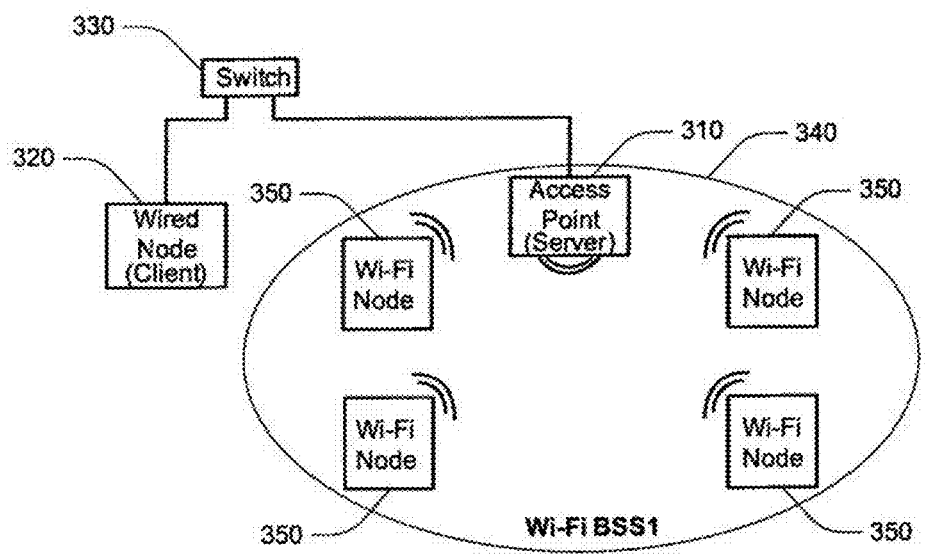
FIG. 3A schematically illustrates a network topology according to one embodiment.

FIG. 3A though 3D illustrate exemplary network topologies across which a client media time reference may be substantially synchronized to a server media time reference. The previously disclosed synchronization method is conveniently applied in cases where the server device and client device are coupled, at least in part by a wired network (noting that such a method may equally be used in situations where the server device and client device are coupled by a wireless network). Typically the server device is used to synchronies multiple other client devices.

Referring to FIG. 3A, a Wi-Fi access point server device 310 is configured to act both as a server device for synchronizing a wired node client device 320, in this example coupled by a network switch 330. In this example, the Wi-Fi access point further defines a first Basic Service Set (BSS) 340 and is configured to couple a plurality of Wi-Fi nodes to this BSS.

Figure 3B:
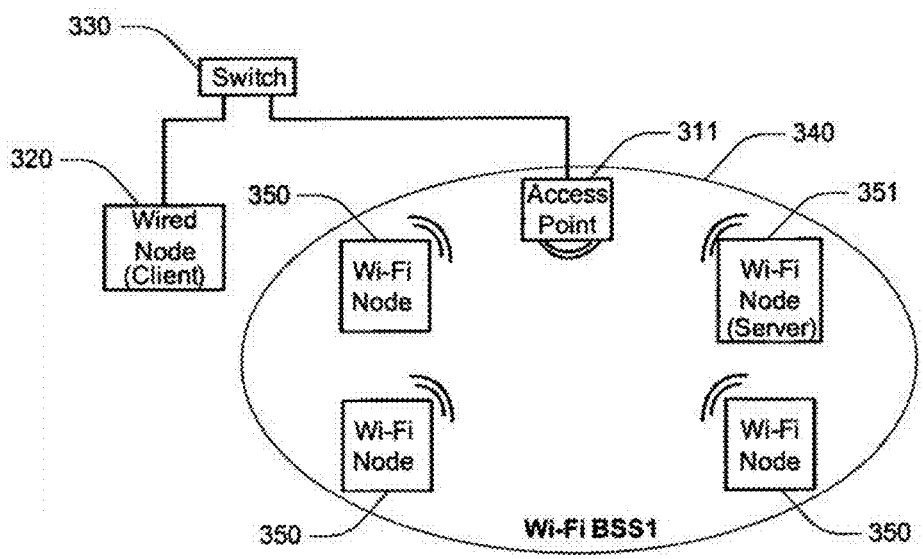
FIG. 3B schematically illustrates a network topology according to one embodiment.

To provide an overview of the alternative illustrations:

FIG. 3B shows an example configuration whereby a Wi-Fi node is configured as a server device 351 for synchronizing a wired node client device 320.

Figure 3C:
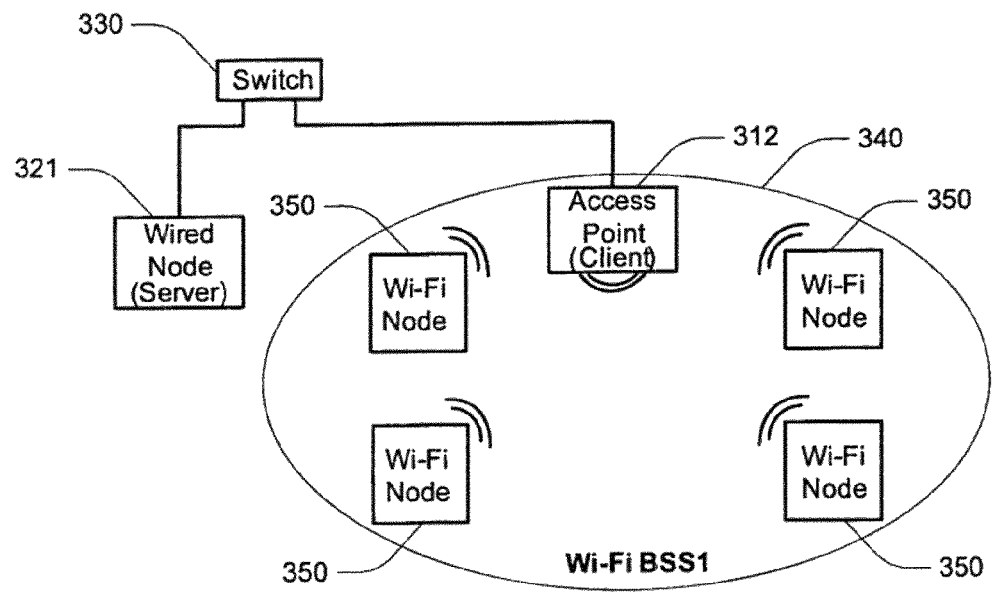
FIG. 3C schematically illustrates a network topology according to one embodiment.

FIG. 3C shows an example configuration whereby a wired node is configured as a server device 321 for synchronizing a Wi-Fi access point client device 312.

Figure 3D:
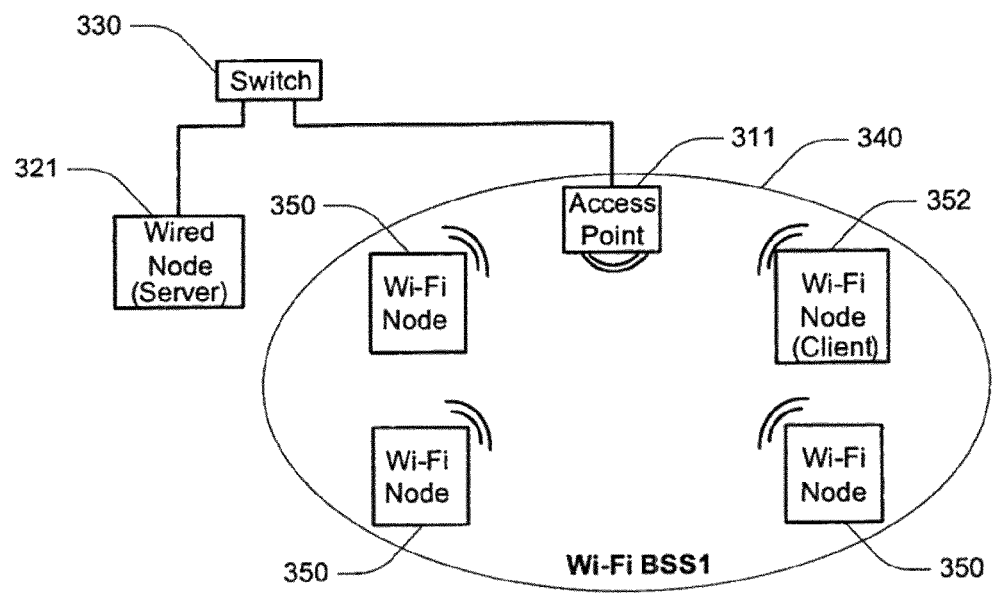
FIG. 3D schematically illustrates a network topology according to one embodiment.

FIG. 3D shows an example configuration whereby a wired node is configured as a server device 321 for synchronizing a Wi-Fi node client device 352.

Patent Cooperation Treaty Application No. PCT/AU2006/001957 (which is herein incorporated by reference in its entirety) teaches a method of frequency synchronizing local media output streams in an audio visual playback arrangement spanning wireless network topologies. This method uses a global network parameter typically intrinsic to the wireless network protocol (e.g. IEEE. 802.11). In IEEE. 802.11 the Time Synchronization Function provides a global clock by which a server device derives a ratio between the frequency of its local media clock and the frequency of TSF global clock.

In light of PCT/AU2006/001957, it should be appreciated that the access point server device 310, access point client device 312, Wi-Fi node client device 352, and any one of Wi-Fi Node 351 configured according to FIGS. 3A and 3B, may further provide a server signal for synchronize other Wi-Fi nodes within their respective service set on the basis of a synchronization method such as those methods taught by PCT/AU2006/001957, and variations thereof. It should be further appreciate that a number of permutations and combinations exist for synchronizing devices across wired and wireless networks, each involving the present method and the method taught by PCT/AU2006/001957.

According to an embodiment, by way of example only, a node coupled to a network can provide the server control time reference. It is preferable that the server having a server control time reference to also act as the 802.11 wireless access point and have direct access to a global time reference (e.g. the Time-Synchronization Function of 802.11) from which the server control time reference is derivable. This is perhaps more preferable in situations where this device is also configured to operate according to methods taught by PCT/AU2006/001957 in relation to other nodes coupled to the wireless network.

According an embodiment, a server providing the server control time reference is further configured as a wireless network node (e.g. 802.11 Wi-Fi node) coupled to an access point that generates a TSF reference signal. In this example a further step is performed, as discussed below.

It would be appreciated that the methods taught by PCT/AU2006/001957 disclose a reference time derived by a wireless network node from a TSF reference signal. This TSF reference signal is typically more accurate just after reception of a beacon frame. Therefore, in this example, it is advantageous for the present synchronization process begins relatively soon after the beacon frame is received, whereby a relatively accurate server control time reference may be observed. This is achieved by, in an embodiment, extending the protocol such that upon reception of a beacon frame by a server, a synchronization process is initiated. By way of example, the server can initiate a synchronization process with all clients by sending a network message over an established network connection. In this embodiment, the message is indicative of information informing the client that a beacon frame has arrived or alternatively is indicative of an instruction to commence a synchronization process. Upon receiving this message, the client initiates a synchronization method as presently described.

Figure 4:
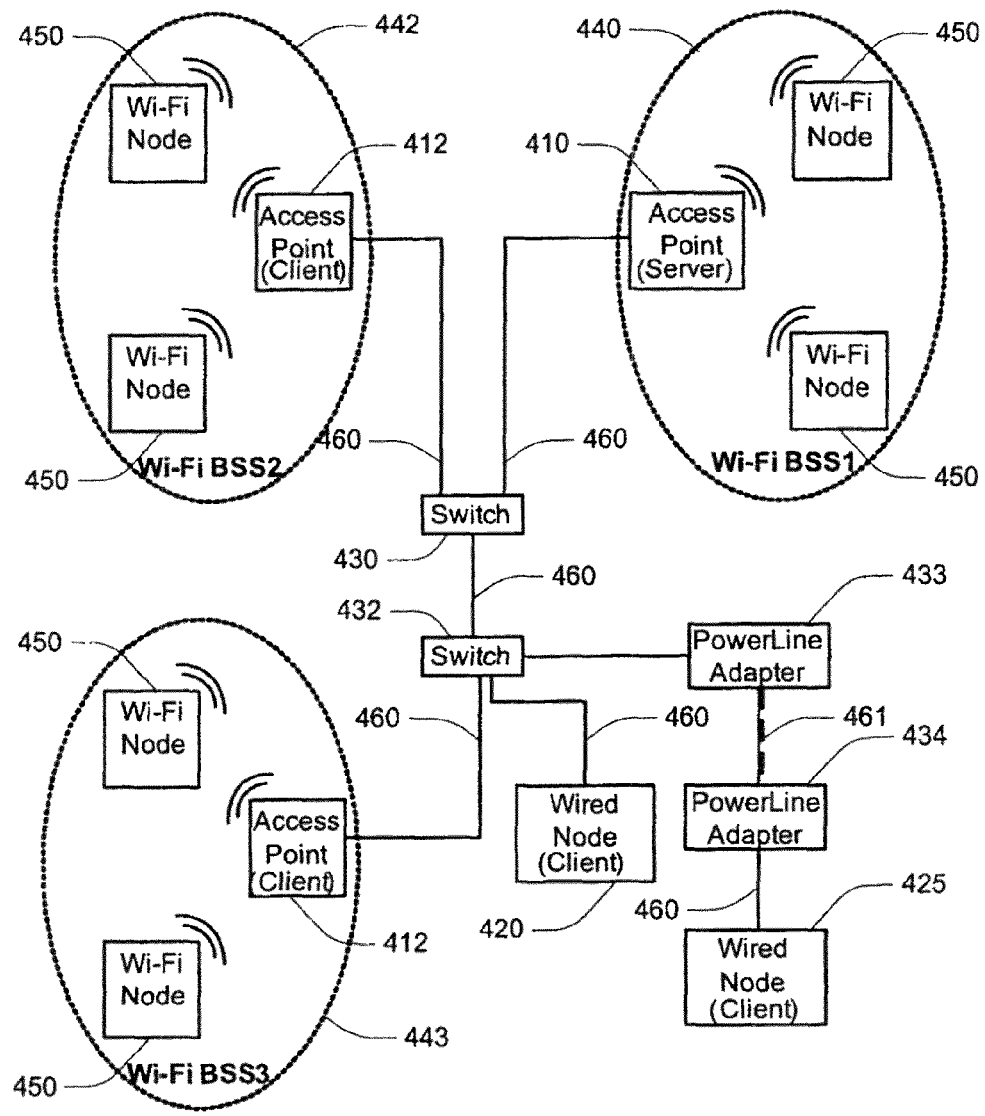
FIG. 4 schematically illustrates a network topology according to one embodiment.

Referring to FIG. 4, by way of example only, it is further possible to synchronize devices across multiple Wi-Fi and wired networks. In this example a Wi-Fi access point 410 is configured as a server device. Other Wi-Fi access points 410, and wired nodes 420 and 425 are configured as client devices. Other wired (and wireless) protocols may be used. In this example Power-Line adaptors 433 and 434 are used to couple devices to facilitate the transfer of data, at least in part, by mains power. It will be appreciated that many other network protocols are employed in other embodiments to appropriately couple a server and client devices to allow the transfer of data. It will be further appreciated that other configurations of server and client devices are possible, particularly in light of the topologies shown in FIG. 3A through 3D.

FIG. 4 schematically illustrates a situation that is typical of many modern homes where there are multiple computers connected to a shared Internet connection via a home TCP/IP network. This home network might be based on a number of standards, with the most popular implementations being Wi-Fi, Ethernet and HomePlug (or other Power line standards).

Network media players download web-based media directly to the devices. This media can then be streamed around the home network to various devices. A benefit of these networked devices is that they can communicate with one another to produce entertainment experiences that are relatively difficult to realize with traditional components. In order to make networked media devices collaborate in an intelligent way, it is preferably that these devices are synchronized. For example, when two networked devices play the same audio track, their playback rates must be synchronized to avoid certain audio artifacts. It is also preferable that the devices are synchronized to a common time base for enabling events, for example play and stop, to occur substantially at the same time.

By way of example, a home installation may require a "party mode" option whereby specified devices on the network playback media content simultaneously. For an audibly pleasing experience, this inherently requires all devices involved to be both playback rate and time base synchronized.

In an embodiment, where two networked speakers are respectively outputting the left and right channel of the media file, if the speakers do not substantially start at the same time there would be an obvious offset between the channels of audio. Also, if video is not time synchronized with the audio then the system will exhibit potentially severe lip-sync problems. Further, if the playback rates of each speaker are not synchronized, any offset can lead result in undesirable audio artifacts.

A mixed network, including multiple network topologies, is present in some embodiments. This is the case where as some devices, for example the devices providing video data, require a higher bandwidth than other devices, for example devices providing audio data.

Devices on switched Ethernet networks do not share a common signal carrier. In order for devices to communicate, they typically pass packets to a switch. The switch then forwards on the packet to the appropriate devices. For most homes the switches used will be of the "store and forward" type. This involves buffering the incoming packets and introduces relatively large and variable packet propagation delays. These delays limit the implementation of known synchronization techniques in this environment, as it is relatively difficult to assert that every device on the Ethernet network will receive timing packets within an acceptable window of time.

Figure 5:
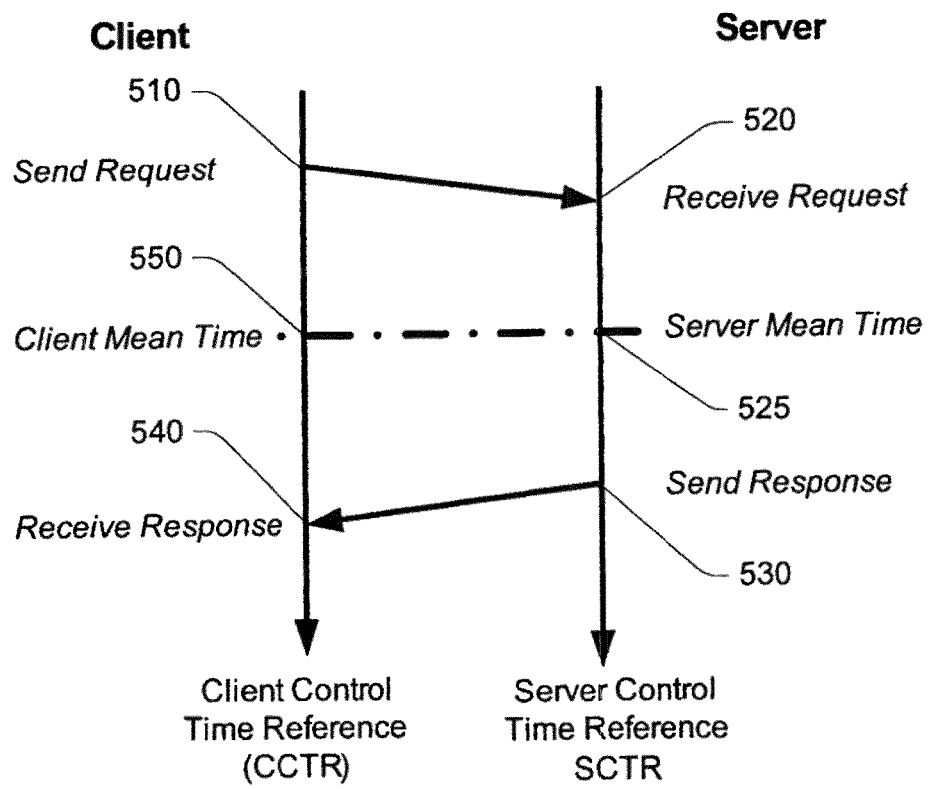
FIG. 5 schematically illustrates a network traffic flow according to one embodiment.

Referring to FIG. 5, the network traffic according to an example embodiment of a method for synchronizing a client device to a mater device. To synchronize these two devices, calculations are made relative to a common time base (the server control time reference). For a Wi-Fi device operating as a server device, this server control time reference timer can be the TSF counter time reference.

The server device establishes a ratio between the frequency of the server control time reference and the server media time reference. By way of example, when the server device is further synchronized to a Wi-Fi network according to a method taught by PCT/AU2006/001957, to maintain the ratio, it is established when a beacon frame (according to the TSF) is received by the server device.

The client device sends a request to the server device. This request is indicative of an instruction to provide timing information indicative of a server control time reference and the server media time reference. The client device also stores, according to a client control time reference, a respective first client value indicative of the time at which that request was sent 510.

The server device receives the request and responds by sending out the requested timing information, including a first server value, according to the server control time reference, indicative of a time at which the server device processed the response, for example device 225. The timing information also includes a ratio between the frequency of the server control time reference and the server media time reference.

The client device receives each response from the server device. The client device also stores, according to a client control time reference, a respective second client value indicative of the time at which that response was received 540.

Adjustment information is derived by processing, for each request and corresponding response, the first client value, the second client value, and the timing information. In this example, the server and client control reference time is first synchronized by adjusting the client control reference time. This is typically an iterative process based on the error between a newly calculated time reference and the time reference measured at the client device. In this example the counter frequency is assumed to be substantially synchronized such that following computations can be performed using the same units of the time reference. It would be appreciated that this client control time reference may be software implemented based on another (typically) asynchronous system clock.

$$\tau'_{CCTR}(540) = \tau_{SCTR}(525) + 0.5 \times (\tau_{CCTR}(540) - \tau_{CCTR}(510)),$$

$$\epsilon_{CCTR} = \tau'_{CCTR}(540) - \tau_{CCTR}(540).$$

By way of example, the estimate client control time reference ($\tau'_{SCTR}(540)$) can be calculated as follows:

In these equations $\tau_{Reference}$ (event) is the time reference value according to the particular reference (e.g. Server Control Time Reference—SCTR) at the occurrence of an event (e.g. 540 of FIG. 5). $\tau'$ refers to an approximation time reference value calculated using other reference values. $\epsilon$ is the error between an approximation and a measured value.

Further adjustment information, for this example, is the ratio between the frequency of the server control time reference and the server media time reference.

The client device then generates a client media time reference by applying the adjustment information to the client control time reference, thereby to synchronize the client media time reference with the server media time reference. As, in this example, the client control time reference is synchronized to the server control time reference. The ratio is directly relevant in deriving the client media time reference from the client control time reference. The client media time reference is then adjusted by this ratio and substantially synchronized with the server media time reference. It is preferable that the client device is adapted to have a means for adjust its local clock rates at a resolution of at least 1 ppm.

By way of example only, the server device is coupled to a Wi-Fi network and is receiving a beacon signal for updating the TSF. This reference signal can be used as the server control time reference, allowing the client device to derive a "virtual" TSF. This virtual TSF value can then be entered into the FLL/PLL section of a device or method as taught by PCT/AU2006/001957.

By way of example only, the standard Network Time Protocol (NTP) can be used between the server and client device for the purpose of generating a virtual "TSF".

An alternative exemplary method for calculating adjustment information for synchronizing a server control time reference and a client control time reference will now be described by reference to FIG. 6. In this example, the client device sends a request to the server device. This request is indicative of an instruction to provide timing information that is indicative of a server control time reference and the server media time reference. The client device also stores, according to a client control time reference, a respective first client value indicative of the time at which that request was sent 610.

The server is adapted to, upon receiving a request 620, send timing information 630 indicative of a server control time reference and the server media time reference. This timing information includes:

A first server value, according to the server control time reference, indicative of the time at which the server device received the request;

A second server value, according to the server control time reference, indicative of the time at which the server device sent the corresponding response; and A ratio between the frequency of the server control time reference and the server media time reference.

The client device receives each response from the server device 640. The client device also stores, according to a client control time reference, a respective second client value indicative of the time at which that response was received.

Adjustment information is derived by processing, for each request and corresponding response, the first client value, the second client value, and the timing information. In this example, the server and client control reference time is first synchronized by adjusting the client control reference time.

For this example, an estimate client control time reference ($\tau'_{CLIENT}(n)$) and the estimate client control time reference ($\tau'_{SERVER}(n)$), in this example, can be calculated for this first iteration according to the following:

$$\tau'_{CLIENT}(n) = (\tau_{CCTR}(640) + \tau_{CCTR}(610)) \times 0.5,$$

$$\tau'_{SERVER}(n) = (\tau_{SCTR}(630) + \tau_{SCTR}(620)) \times 0.5.$$

Figure 6:
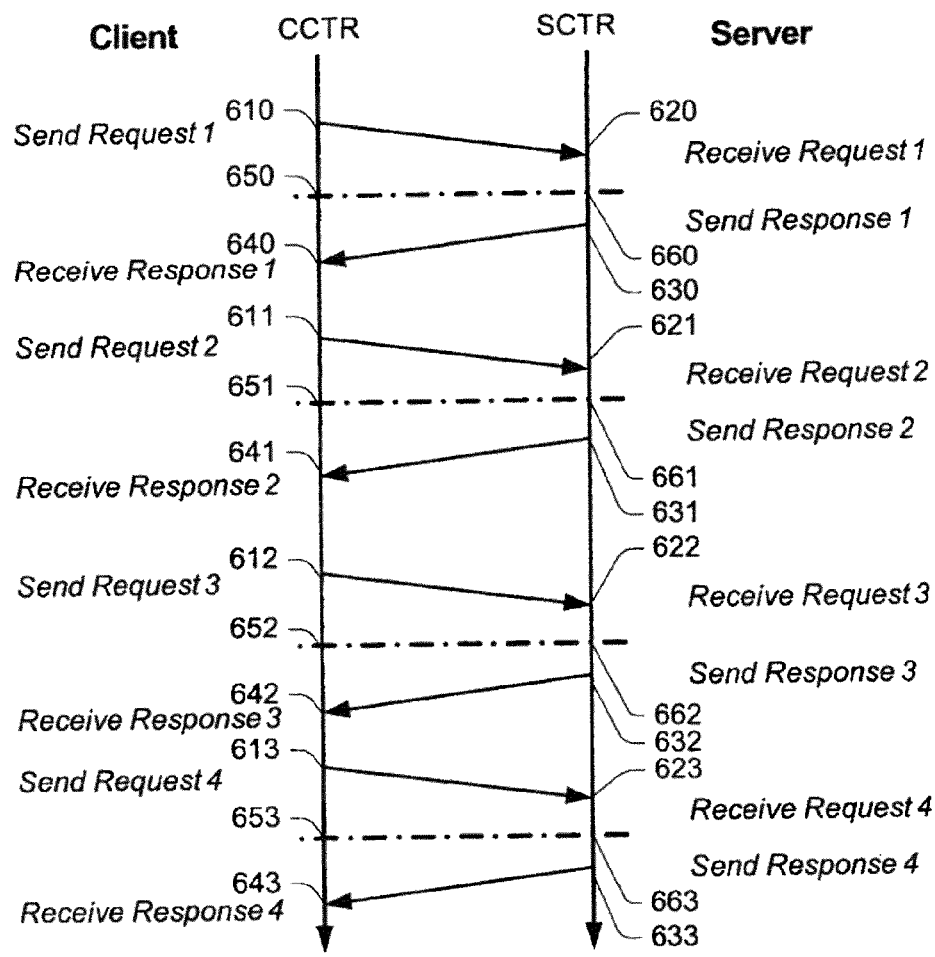
FIG. 6 schematically illustrates a network traffic flow according to one embodiment.

This is then repeated more than once (for example 4 times), as shown in FIG. 6, to provide a series of corresponding server and client time estimates. In this example four requests are sent (610, 611, 612 and 613) and received at (620, 621, 622 and 623). Four corresponding responses are also sent (630, 631, 632 and 633) and received at (640, 641, 642 and 643). It would be appreciated that, in other embodiments, the server can provide only one time value, which will be used as the estimate $\tau'_{SERVER}(n)$.

A plurality of value pairs indicative of a server control time reference estimate and a respective client control time reference estimate, as similarly calculated according to the above equations for each repeated transition. In effect these equations identify the mean time, according to the respective control time reference, between the process of receiving and sending. It would also be appreciated that these expressions may be expressed mathematically in numerous alternative ways.

Figure 7:
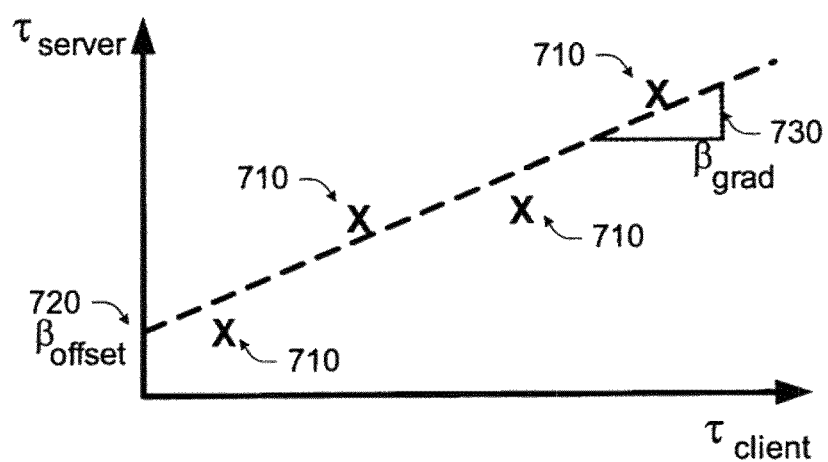
FIG. 7 schematically illustrates an exemplary linear regression method according to one embodiment.

A line-fitting algorithm such as simple linear regression or simple averaging can then be applied to find a line best fit for these points 710, as can be represented graphically by FIG. 7.

In an embodiment, by way of example only, the mathematical relationship between the pairs of points on a line of best fit can be represent as:

$$\begin{bmatrix} \tau'_{SERVER}(1) \\ \vdots \\ \tau'_{SERVER}(n) \end{bmatrix} = \begin{bmatrix} 1 & \tau'_{CLIENT}(1) \\ \vdots & \vdots \\ 1 & \tau'_{CLIENT}(n) \end{bmatrix} \begin{bmatrix} \beta_{OFFSET} \\ \beta_{GRAD} \end{bmatrix} + \begin{bmatrix} \varepsilon(1) \\ \vdots \\ \varepsilon(n) \end{bmatrix}$$

Where $\beta_{OFFSET}$ and $\beta_{GRAD}$ are the line offset and gradient respectively. The noise (or error) term in this equation is represented by $\varepsilon$.

By way of example only, a least-squares solutions for the $\beta_{OFFSET}$ and $\beta_{GRAD}$ can be provided by:

$$\begin{bmatrix} \beta_{OFFSET} \\ \beta_{GRAD} \end{bmatrix} = \left( \begin{bmatrix} 1 & \tau'_{CLIENT}(1) \\ \vdots & \vdots \\ 1 & \tau'_{CLIENT}(n) \end{bmatrix}^T \begin{bmatrix} 1 & \tau'_{CLIENT}(1) \\ \vdots & \vdots \\ 1 & \tau'_{CLIENT}(n) \end{bmatrix} \right)^{-1} \begin{bmatrix} 1 & \tau'_{CLIENT}(1) \\ \vdots & \vdots \\ 1 & \tau'_{CLIENT}(n) \end{bmatrix}^T \begin{bmatrix} \tau'_{SERVER}(1) \\ \vdots \\ \tau'_{SERVER}(n) \end{bmatrix}$$

The gradient ($\beta_{GRAD}$) of this line of best fit represents frequency ratio between the average server control time reference and the client control time reference. This ratio can then be used in combination with the average frequency ratio between the server control time reference and the server media time reference can be used to produce a frequency and or phase error to adjust the Client Media Time Reference.

Referring to FIG. 7, by way of example only, the above method is also conveniently used to synchronize the client control time reference to the server control time reference. Once the two nodes are suitably synchronized in frequency and/or phase (for example to a few parts per million ppm), the error of each point on the graph from the line of best fit, between the average server control time reference and the client control time reference, provides a measure of how repeatable and/or symmetrical the transaction to obtain that point was. In an embodiment, the point on the graph that is closest to the fitted line is considered the most accurate client control time reference indicative of the server control time reference, and can be used for calculating timing of future events such as Play, Pause etc.

This approach relies on the calculation of a ratio between frequencies of the server control time reference and client control time reference. It would be appreciated that this ratio can, in other embodiments, be used in combination with the ratio between the frequencies of the server control time reference and server media time reference to derive a direct ratio between the frequencies of the client control time reference and client media time reference. The ratio between the frequencies of the client control time reference and client media time reference can be used to adjust the client control time reference to provide a client media time reference that is frequency synchronized with the server media time reference.

Figure 8:
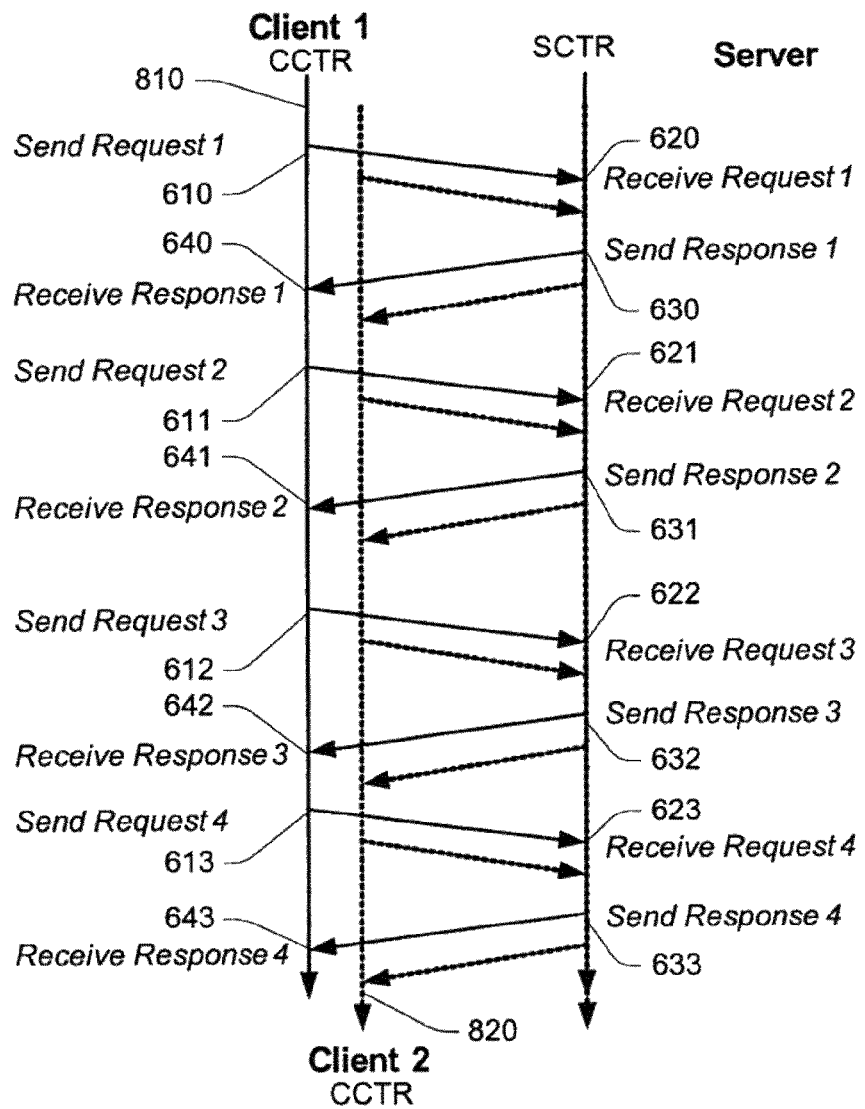
FIG. 8 schematically illustrates a network traffic flow according to one embodiment.

The methods disclosed can also be used to synchronize multiple devices on the network, including simultaneously. In an embodiment, if the server control time reference is not updated these methods can be performed at any time. In another embodiment it is possible to stager the sending of request messages from different client devices as indicated by the separate client control time reference axis 810 and 820, as shown in FIG. 8.

It will be appreciated that although examples have been provided involving Wi-Fi and Ethernet, other embodiments are applicable for synchronizing a client device with a server device with other form of data networks or multiple combinations thereof.

While an embodiment for operation conforming to the IEEE 802.11 standard has been described, the invention may be embodied using devices conforming to other wireless network standards and for other applications, including, for example other WLAN standards and other wireless standards. Applications that can be accommodated include IEEE 802.11 wireless LANs and links, wireless Ethernet, HIPERLAN 2, European Technical Standards Institute (ETSI) broadband radio access network (BRAN), and multimedia mobile access communication (MMAC) systems, wireless local area networks, local multipoint distribution service (LMDS) IF strips, wireless digital video, wireless USB links, wireless IEEE 1394 links, TDMA packet radios, low-cost point-to-point links, voice-over-IP portable "cell phones" (wireless Internet telephones), etc.

Embodiments of the invention may also be for operation in networks including power line networks that use radio frequencies, e.g., radio frequency bursts, OFDM bursts, and so forth. One example is X10. Thus the term wireless is to be interpreted broadly herein to include wired communication that using radio frequency signals.

In the context of this document, the term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. In the context of this document, the term "wired" and its derivatives may be used to describe circuits, devices, systems, methods, techniques, communications channels, etc., that may communicate data through the use of modulated electromagnetic radiation through a solid medium. The term does not imply that the associated devices are coupled by electrically conductive wires.

Unless specifically stated otherwise, as apparent from the following discussions, it is appreciated that throughout the specification discussions utilizing terms such as "processing," "computing," "calculating," "determining" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The methodologies described herein are, in one embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., a liquid crystal display (LCD) or a cathode ray tube (CRT) display. If manual data entry is required, the processing system also includes a source device such as one or more of an alphanumeric input unit such as a keyboard, a pointing control device such as a mouse, and so forth. The term memory unit as used herein, if clear from the context and unless explicitly stated otherwise, also encompasses a storage system such as a disk drive unit. The processing system in some configurations may include a sound output device, and a network interface device. The memory subsystem thus includes a computer-readable carrier medium that carries computer-readable code (e.g., software) including a set of instructions to cause performing, when executed by one or more processors, one of more of the methods described herein. Note that when the method includes several elements, e.g., several steps, no ordering of such elements is implied, unless specifically stated. The software may reside in the hard disk, or may also reside, completely or at least partially, within the RAM and/or within the processor during execution thereof by the computer system. Thus, the memory and the processor also constitute computer-readable carrier medium carrying computer-readable code.

Furthermore, a computer-readable carrier medium may form, or be included in a computer program product.

In alternative embodiments, the one or more processors operate as a standalone device or may be connected, e.g., networked to other processor(s), in a networked deployment, the one or more processors may operate in the capacity of a server or a client machine in server-client network environment, or as a peer machine in a peer-to-peer or distributed network environment. The one or more processors may form a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Note that while some diagram(s) only show(s) a single processor and a single memory that carries the computer-readable code, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Thus, one embodiment of each of the methods described herein is in the form of a computer-readable carrier medium carrying a set of instructions, e.g., a computer program that are for execution on one or more processors, e.g., one or more processors that are part of a component playback unit. Thus, as will be appreciated by those skilled in the art, embodiments of the present invention may be embodied as a method, an apparatus such as a special purpose apparatus, an apparatus such as a data processing system, or a computer-readable carrier medium, e.g., a computer program product. The computer-readable carrier medium carries computer readable code including a set of instructions that when executed on one or more processors cause a processor or processors to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code embodied in the medium.

The software may further be transmitted or received over a network via a network interface device. While the carrier medium is shown in an example embodiment to be a single medium, the term "carrier medium" should be taken to include a single medium or multiple media (e.g., a centralized or distributed database, and/or associated caches and servers) that store the one or more sets of instructions. The term "carrier medium" shall also be taken to include any non-transitory medium that is capable of storing, encoding or carrying a set of instructions for execution by one or more of the processors and that cause the one or more processors to perform any one or more of the methodologies of the present invention. A non-transitory carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. For example, the term "carrier medium" shall accordingly be taken to included, but not be limited to, solid-state memories, a computer product embodied in optical and magnetic media, and other non-transitory carrier media.

It will be understood that the steps of methods discussed are performed in one embodiment by an appropriate processor (or processors) of a processing (i.e., computer) system executing instructions (computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

Any discussion of prior art in this specification should in no way be considered an admission that such prior art is widely known, is publicly known, or forms part of the general knowledge in the field.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

Similarly, it is to be noticed that the term coupled, when used in the claims, should not be interpreted as being limitative to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

The invention claimed is:

1. A method for operating a non-wireless media playback client device, the method comprising:

performing the following steps via execution of software instructions by the non-wireless media device thereby to provide synchronized media playback, such that the non-wireless media playback device is synchronized with a plurality of wireless playback nodes that are associated with a common wireless network, the plurality of playback nodes having access to a common global clock of the wireless network and being synchronized relative to the common global clock of the wireless network, wherein the non-wireless media playback device does not have access to the common global clock of the wireless network:

(a) sending, via a wired network connection, a request to a server device, the server device being associated with the wireless network and having access to the common global clock of the wireless network, the request being indicative of an instruction to provide timing information indicative of a server control time reference and a server media time reference, wherein the timing information includes a ratio between the frequency of the server control time reference and the server media time reference, wherein the server control time reference is defined relative to the common global clock of the wireless network;

(b) storing, in respect of the request sent to the server device, according to a client control time reference, a respective first client value indicative of the time at which that request was sent;

(c) receiving from the server device, in respect of the request sent to the server device, a respective response including the timing information;

(d) storing, according to the client control time reference, a respective second client value indicative of the time at which the corresponding response was received;

each of step (a) to step (d) being repeated on one or more occasions;

(e) processing, for each request and corresponding response, the first client value, the second client value, and the timing information, thereby to derive adjustment information, wherein the adjustment information is indicative of a first frequency ratio between the server control time reference and the client control time reference and a second frequency ratio between the server media time reference and the server control time reference;

(f) generating a client media time reference by applying the adjustment information to the client control time reference, thereby to frequency synchronize the client media time reference with the server media time reference; and (g) providing media playback by rendering a stream of media data based on the client media time reference.

2. A method according to claim 1, wherein the server device is coupled to the client device, at least in part, by a wired network.

3. A method according to claim 1, wherein the server device is coupled to and synchronized with one or more further devices on a synchronized wireless network.

4. A method according to claim 1, wherein the synchronized wireless network is synchronized based on any one of the server control time reference.

5. A method according to claim 1, wherein the client control time reference is adjusted in a frequency locked loop to synchronize the client media time reference to the server media time reference.

6. A method according to claim 1, wherein the timing information includes:
a first server value, according to the server control time reference, indicative of the time at which the server device received the request;
a second server value, according to the server control time reference, indicative of the time at which the server device sent the corresponding response; and
a ratio between the frequency of the server control time reference and the server media time reference.

7. A method according to claim 1, wherein the timing information includes:
a first server value, according to the server control time reference, indicative of a time at which the server device processed the response; and
a ratio between the frequency of the server control time reference and the server media time reference.

8. A method according to claim 6, wherein the first server value and the second server value are each associated with a Time Synchronization Function Protocol.

9. A method according to claim 6, wherein the client control time reference is adjusted in a frequency locked loop to synchronize the client media time reference to the server media time reference.

10. A method according to claim 6, wherein the frequency ratio between the server control time reference and the client control time reference is calculated from a linear regression between the mean of the first and second server value and the mean of the first and second client value for each request and corresponding response.

11. A method according to claim 6, wherein the server control time reference and the server media time reference are defined by a first common timing reference.

12. A method according to claim 6, wherein the client control time reference and the client media time reference are defined by a second common timing reference.

13. A non-transitory computer-readable carrier medium carrying a set of instructions that when executed by one or more processors cause the one or more processors to carry out a method of operating a non-wireless media playback client device thereby to provide synchronized media playback, the method comprising:

executing the following steps at the non-wireless media playback device thereby to synchronize with a plurality of wireless playback nodes that are associated with a common wireless network, the plurality of playback nodes having access to a common global clock of the wireless network and being synchronized relative to a common global clock of the wireless network, wherein the non-wireless media playback device does not have access to the common global clock of the wireless network:

(a) sending, via a wired network connection, a request to a server device, the server device being associated with the wireless network and having access to the common global clock of the wireless network, the request being indicative of an instruction to provide timing information indicative of a server control time reference and a server media time reference, wherein the timing information includes a ratio between the frequency of the server control time reference and the server media time reference, wherein the server control time reference is defined relative to the common global clock of the wireless network;

(b) storing, in respect of the request sent to the server device, according to a client control time reference, a respective first client value indicative of the time at which that request was sent;

(c) receiving from the server device, in respect of the request sent to the server device, a respective response including the timing information;

(d) storing, according to the client control time reference, a respective second client value indicative of the time at which the corresponding response was received;

(e) repeating step (a) to step (d) on one or more occasions;

(f) processing, for each request and corresponding response, the first client value, the second client value, and the timing information, thereby to derive adjustment information, wherein the adjustment information is indicative of a first frequency ratio between the server control time reference and the client control time reference and a second frequency ratio between the server media time reference and the server control time reference; and (g) generating a client media time reference by applying the adjustment information to the client control time reference, thereby to frequency synchronize the client media time reference with the server media time reference;

(h) providing media playback by rendering a stream of media data based on the client media time reference.

14. A client device comprising:

a network interface for allowing the client device to communicate with a server device via a data network, the server device having a server media time reference;

a processor coupled to the network interface for performing a method of operating a non-wireless media playback client device thereby to provide synchronized media playback, the method being stored in memory as instructions executable by the processor, the media playback being synchronized with a plurality of wireless playback nodes that are associated with a common wireless network, the plurality of nodes being synchronized relative to a global clock of the wireless network, wherein the non-wireless playback device does not have access to the global clock of the wireless network, the method comprising:

(a) sending, via a wired network connection, a request to a server device, the server device being associated with the wireless network and having access to the global clock of the wireless network, the request being indicative of an instruction to provide timing information indicative of a server control time reference and the server media time reference, wherein the timing information includes a ratio between the frequency of the server control time reference and the server media time reference, wherein the server control time reference is defined relative to the global clock of the wireless network;

(b) storing, in respect of the request sent at (a), according to a client control time reference, a respective first client value indicative of the time at which that request was sent;

(c) receiving from the server device, in respect of the request sent at (a), a respective response including the timing information;

(d) storing, according to the client control time reference, a respective second client value indicative of the time at which the corresponding response was received;

(e) repeating steps (a) to (d) on one or more occasions;

(f) processing, for each request and corresponding response, the first client value, the second client value, and the timing information, thereby to derive adjustment information, wherein the adjustment information is indicative of a first frequency ratio between the server control time reference and the client control time reference and a second frequency ratio between the server media time reference and the server control time reference;

(g) generating a client media time reference by applying the adjustment information to the client control time reference, thereby to frequency synchronize the client media time reference with the server media time reference; and (h) providing media playback by rendering a stream of media data based on the client media time reference.

* * * * *